(12) United States Patent
Kim

(10) Patent No.: US 8,692,763 B1
(45) Date of Patent: Apr. 8, 2014

(54) LAST SCREEN RENDERING FOR ELECTRONIC BOOK READER

(76) Inventor: John T. Kim, La Canada, CA (US)

( * ) Notice: Subject to any disclaimer, the term of this patent is extended or adjusted under 35 U.S.C. 154(b) by 1023 days.

(21) Appl. No.: 12/567,984

(22) Filed: Sep. 28, 2009

(51) Int. Cl.
 *G09G 5/00* (2006.01)

(52) U.S. Cl.
 USPC ............................ 345/156; 345/173; 345/520

(58) Field of Classification Search
 USPC .................. 345/156, 48, 708, 520, 173, 172; 725/116; 710/8; 359/296
 See application file for complete search history.

(56) References Cited

U.S. PATENT DOCUMENTS

| | | | |
|---|---|---|---|
| 7,057,591 B1 | 6/2006 | Hautanen et al. | |
| 7,920,320 B2 * | 4/2011 | Watson et al. | 359/296 |
| 8,018,431 B1 * | 9/2011 | Zehr et al. | 345/156 |
| 8,161,198 B2 * | 4/2012 | Kikuchi | 710/8 |
| 2002/0126140 A1 * | 9/2002 | Gorbet et al. | 345/708 |
| 2004/0049743 A1 | 3/2004 | Bogward | |
| 2006/0109242 A1 * | 5/2006 | Simpkins | 345/156 |
| 2006/0145950 A1 * | 7/2006 | Tanaka | 345/48 |
| 2009/0231233 A1 | 9/2009 | Liberatore | |
| 2009/0267909 A1 * | 10/2009 | Chen et al. | 345/173 |
| 2010/0095340 A1 * | 4/2010 | Ei et al. | 725/116 |
| 2010/0164888 A1 * | 7/2010 | Okumura et al. | 345/173 |
| 2010/0188327 A1 * | 7/2010 | Frid et al. | 345/156 |
| 2010/0328223 A1 * | 12/2010 | Mockarram-Dorri et al. | 345/173 |
| 2011/0050594 A1 | 3/2011 | Kim et al. | |
| 2011/0057884 A1 * | 3/2011 | Gormish et al. | 345/173 |
| 2011/0069073 A1 * | 3/2011 | Unger | 345/520 |
| 2012/0197998 A1 | 8/2012 | Kessel et al. | |

OTHER PUBLICATIONS

Kindle Community, Discussions—Screen Saver, retrieved from the internet on Nov. 6, 2009 at <<http://www.amazon.com/tag/kindle/forum?cdForum=Fx1D7SY3BVSESG&cdThread=Tx28QGUBE29L22J>>, 4 pages.

Office action for U.S. Appl. No. 13/070,328, mailed on Jul. 25, 2013, Rachabathuni, "Last Screen Rendering for Electronic Book Readers", 11 pages.

Office action for U.S. Appl. No. 12/886,877, mailed on Sep. 11, 2013, Belin et al., "Cover Display", 31 pages.

* cited by examiner

Primary Examiner — Thuy Pardo
(74) Attorney, Agent, or Firm — Lee & Hayes, PLLC

(57) ABSTRACT

A handheld dedicated electronic book ("eBook") reader device and last screen rendering techniques for enhancing user experience are described. The eBook reader device detects certain screen conversion events, such as a timeout period, a scheduled event, or an event derived from user behavior. Upon detection of such events, the eBook reader device renders, as the last screen image to remain visible after the user ceases using the device, an image that conveys to the user some meaningful association with a content item. In the context of eBooks, the eBook reader device renders a representation of the book cover as the last screen image. A progress indicator may further be included to represent user progress through the content item.

42 Claims, 9 Drawing Sheets

LAST SCREEN RENDERING FOR ELECTRONIC BOOK READER

BACKGROUND

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistant (PDA), portable media players, tablet computers, netbooks, and the like.

One particular device that is gaining in popularity is the dedicated electronic book ("eBook") reader device, which attempts to mimic the experience of reading a conventional book through display of electronic information on one or more electronic displays. As the quantity of available media content continues to grow, along with increasing proliferation of such dedicated devices to consume that media content, finding ways to enhance user experience continues to be a priority. As eBook reader devices continue to evolve, there remains a need for improving a reader's ability to relate comfortably with the eBooks, and begin to feel as though he is picking up the book itself, rather than a generic electronic device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes last screen rendering techniques to enhance user experience with a dedicated handheld electronic book ("eBook") reader device. The eBook reader device is designed to allow users to read or otherwise consume electronic content (e.g., text, graphics, audio, multimedia, and the like), such as that found in eBooks (e.g., books, magazines, newspapers, periodicals, or other types of electronic documents), RSS feeds, audio books, and the like. The eBook reader device described herein employs electronic paper ("ePaper") display technology. A characteristic of ePaper display technology is that the display is bi-stable, meaning that it is capable of holding text or other rendered images even when very little or no power is supplied to the display. Thus, the last screen image rendered on the display can be maintained and visible for very long periods of time, such as days or weeks.

The techniques described herein enhance user experience by enabling the eBook reader device to render, as the last screen image to remain visible after the user ceases using the device, an image that conveys to the user some meaningful association with a content item. For instance, in the case of eBooks, the eBook reader device renders a representation of the book cover as the last screen image. In other scenarios, the eBook reader device determines, based on a schedule or past user behavior, which content item the user is likely to consume next. Based on this determination, the eBook reader device renders, as the last screen image that persists for long periods, a representation of that content item that the user is likely to consume next. In this manner, the eBook reader device projects an identity of a content item, rather than as a generic electronic device.

For discussion purposes, the techniques are described in the context of an eBook reader device used to facilitate reading of electronic books. However, the features discussed below may be applied to other content items, such as audio books, and so forth.

Illustrative eBook Reader Device

Figure 1:
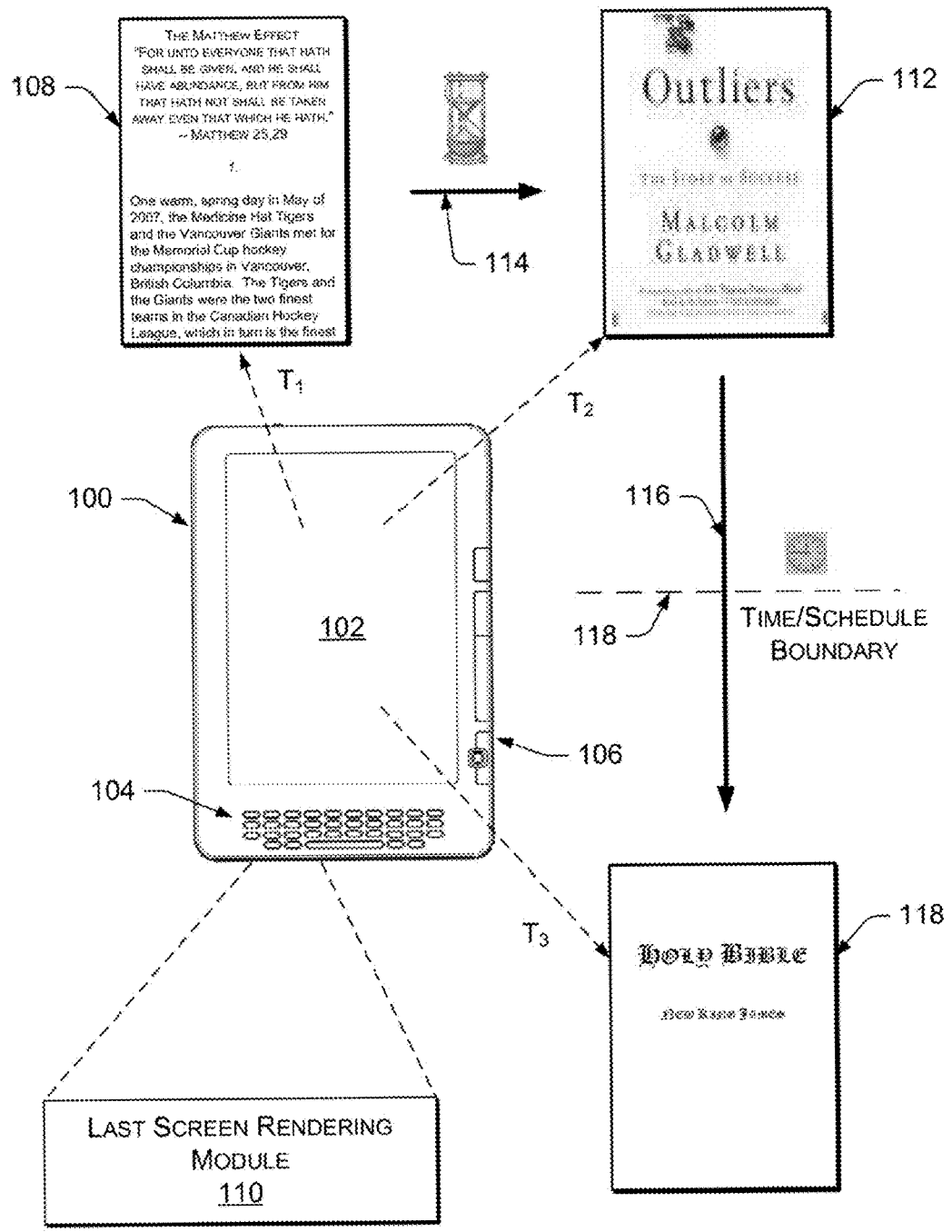
FIG. 1 illustrates one exemplary implementation of a handheld dedicated electronic book ("eBook") reader device that implements last screen rendering techniques to leave a last screen image on the eBook reader device that is relevant to content that a user is presently consuming or is expected to consume next.

FIG. 1 illustrates an exemplary eBook reader device 100 that is embodied as a handheld, dedicated eBook reader device. The eBook reader device 100 is equipped with a passive display 102 to present content in a human-readable format to a user. The content presented on the display 102 may take the form of electronic books or "eBooks". For example, the display 102 depicts the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 102 may further include touch screen capabilities that allow user input through contact or gesturing relative to the display. For convenience only, the display 102 is shown in a generally rectangular configuration. However, it is understood that the display 102 may be implemented in any shape, and may have any ratio of height to width. Also, for stylistic or design purposes, the touch-screen display 102 may be curved or otherwise non-linearly shaped.

The eBook reader device 100 also has a keyboard 104 beneath the display 102 and one or more actuatable controls 106 that may have dedicated or assigned operations. For instance, the actuatable controls 106 may include page turning buttons, a joystick, navigational keys, a power on/off button, selection keys, joystick, touchpad, and so on.

In FIG. 1, the display 102 is shown depicting a current page 108 of the eBook version of the work titled, "Outliers" by Malcolm Gladwell. This represents a point in time $T_1$ at which the user is actively reading through the eBook. The term "page" as used herein refers to a collection of content that is presented at one time on the display 102. Thus, a "page" may be understood as a virtual frame of the content, or a visual display window presenting the content to the user. Accordingly, "pages" as described herein are not fixed permanently, in contrast to the pages of published "hard" books. Instead, pages described herein may be redefined or repaginated when, for example, the user chooses a different font or font size for displaying the content on the display 102.

The eBook reader device 100 has various internal electronic components and software modules, which include a last screen rendering module 110 that is responsible for rendering the final image presented on the display 102 after the user ceases reading the eBook. The last screen rendering module 110 may include a timer to track a time period from the last user input. When a sufficient time period has lapsed, the module 110 assumes that the user is likely to have ceased reading the eBook. In response, the last screen rendering module 110 renders one more screen image before entering a dormant or sleep mode. The last screen image is chosen to convey something meaningful about the eBook. In one implementation, the last screen image is a representation of the book cover.

In FIG. 1, suppose that the last screen rendering module 110 determines that a sufficient time period has lapsed since the user has last interacted with the current page 108 in the "Outliers" book. The last screen rendering module 110 replaces the current page 108 with an image of the book cover 112, as represented by the temporal lapse transition 114. Thus, the book cover image 112 is depicted at a time $T_2$ after a predefined time lapse from the last user interaction.

As an alternative to time lapse, the last screen rendering module 110 may further detect when the user proactively inputs a command to transition the eBook reader device 100 from an active state to a non-active state (e.g., sleep, rest, lower power level, etc.). The user may, for example, input a command using a touch screen 102 (if available), the keyboard 104, or actuatable controls 106 to "power down" or otherwise force the device 100 into a non-active state. In response, the last screen rendering module 110 may then convert the current page 108 with the book cover image 112.

In another implementation, the last screen rendering module 110 may further render a screen image of an eBook that the user is likely to consume next. The last screen rendering module 110 may allow a user to schedule when it is likely to be reading certain works. For instance, a student may enter her class schedule, and the last screen rendering module 110 renders images of book covers of the class texts the student is likely to read during the course of the day. Alternatively, the last screen rendering module 110 may anticipate the next likely work based on past user behavior. For instance, the user may exhibit a preference for historical novels in the evening and work-related books during the day.

In FIG. 1, this is illustrated by another transition 116 that occurs when traversing a time or schedule boundary 118. These boundaries 118 may be explicitly entered by the user, automatically retrieved from the user's schedule (e.g., interacting with the user's calendar), or learned from the user's behavior. Moreover, the user's schedule may be kept locally on the device 102, or be kept remotely and hence be received from a remote source (e.g., another computer, server, etc.) over a network, such as a wireless network. When a boundary is reached, the last screen rendering module 110 renders an image of the next eBook that the user is likely to read. In this illustration, the time boundary represents an overnight transition to the morning timeframe, when the user is likely to read the Bible. Thus, at time $T_3$, a cover image 120 of the Bible is represented on the display 102, replacing the previous image of the "Outliers" book cover 112 that the user was reading the previous evening.

Figure 2:
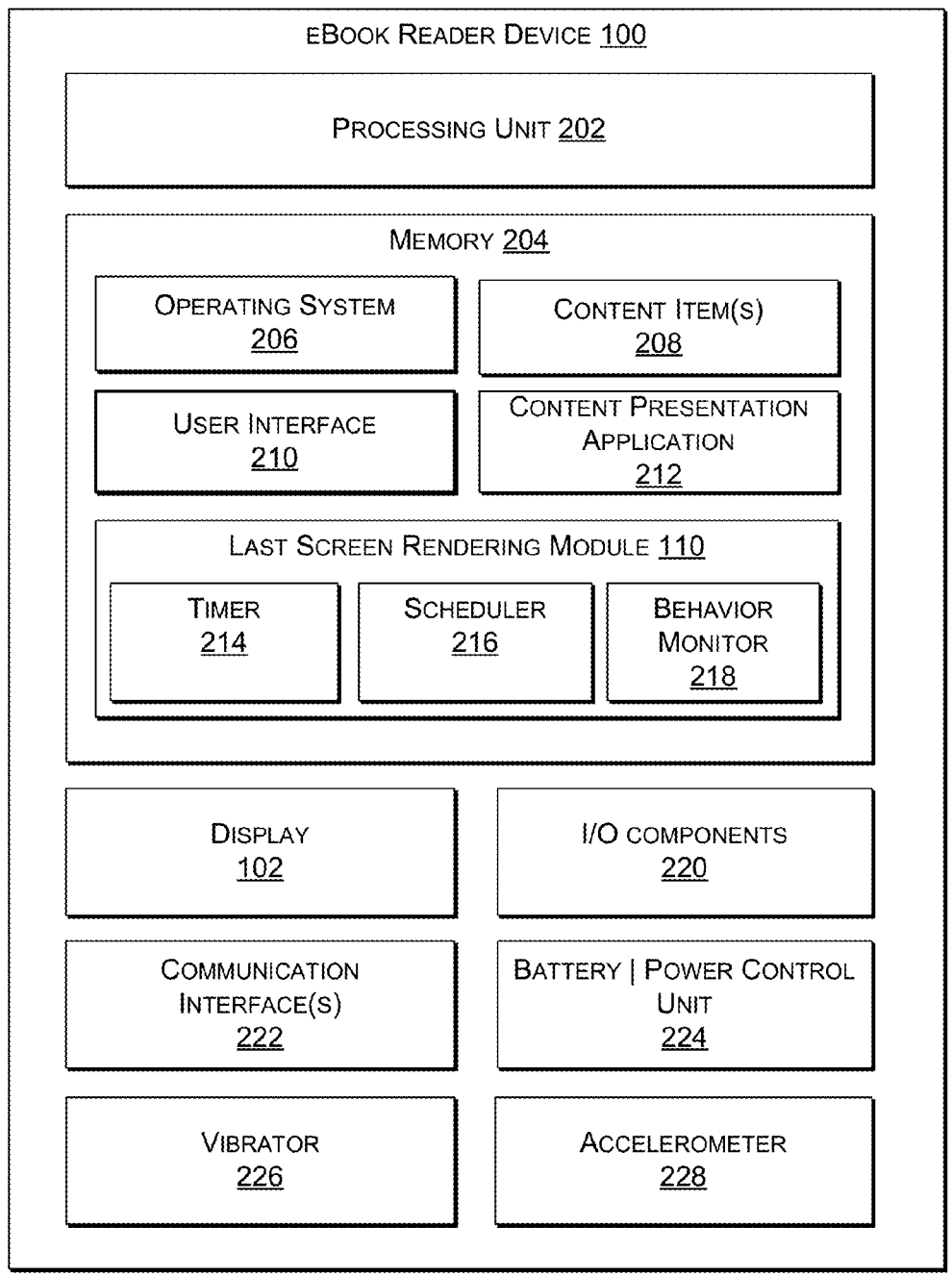
FIG. 2 is a block diagram showing selected components of the eBook reader device.

FIG. 2 illustrates selected functional components that might be implemented within the eBook reader device 100. In a very basic configuration, the device 102 includes a processing unit 202 composed one of one or more processors, and memory 204. Depending on the configuration of a dedicated eBook reader device 100, the memory 204 is an example of computer storage media and may include volatile and non-volatile memory. Thus, the memory 204 may include, but is not limited to, RAM, ROM, EEPROM, flash memory, or other memory technology, or any other medium which can be used to store media items or applications and data which can be accessed by the eBook reader device 100.

The memory 204 may be used to store any number of functional components that are executable on the processing unit 202, as well as data and content items that are rendered by the eBook reader device 102. Thus, the memory 204 may store an operating system 206 and an eBook storage database to store one or more content items 208, such as eBooks and audio books. The memory may further include a memory portion designated as an immediate page memory to temporarily store one or more pages of an electronic book. The pages held by the immediate page memory are placed therein a short period before a next page request is expected.

A user interface module 210 may also be provided in memory 204 and executed on the processing unit 202 to facilitate user operation of the device 100. The UI module 210 may provide menus and other navigational tools to facilitate selection and rendering of the content items 208. The UI module 210 may further include a browser or other application that facilitates access to sites over a network, such as websites or online merchants.

A content presentation application 212 renders the content items 208. The content presentation application 212 may be implemented as various applications depending upon the content items. For instance, the application 212 may be an electronic book reader application for rending electronic books, or an audio player for playing audio books, or a video player for playing video, and so forth.

The last screen rendering module 110 may also be implemented as a software module stored in memory 204 and executable on the processing unit 202. The last screen rendering module 110 detects screen conversion events, such as time lapses, scheduled items, events set based on user behavior, and so forth. Upon detecting a screen conversion event, the last screen rendering module 110 directs the display 102 to present either (1) a visible representation associated with a content item that the user was last interacting with, or (2) a visible representation associated with a different content item. In the case of electronic books, the last screen rendering module 110 may render images of covers associated with the electronic books. In this manner, the eBook reader device is left standing with a screen depicting the cover of the last book that the reader was reading, or of the next book that the reader is likely to begin reading. Thus, the eBook reader device may be identified more by the book's cover than as an electronic device. Since the ePaper display can last for days or weeks or maybe even months, the cover image may remain visible on the device for long periods until the user once again begins interacting with the device.

The last screen rendering module 110 may implement different mechanisms for determining when to render the last screen image. Illustrated mechanisms include a timer 214, a schedule 216, and a behavior monitor 218.

The timer 214 is configured to detect when the user ceases interacting with the eBook reader device 100 for a threshold period of time. The threshold period may be user configurable. In one implementation, the threshold period is at least five minutes, although longer or shorter durations are possible. When the timer 214 reaches the threshold period, a screen conversion event is generated, causing the last screen rendering module 110 to render a different image on the display 102 that will be visibly persist until the user once again begins interacting with the eBook reader device 100. In the context of electronic books, the last screen rendering module 110 converts the screen image to that of the book's cover, rather than a particular page.

The schedule 216 allows the user to schedule, expressly or indirectly, one or more screen conversion events. Generally, the scheduler 216 enables the user to set a particular time of day, and/or day of week, as a screen conversion event in which to convert the display to an image that is associated with the same content item or another one. For instance, the user may schedule reading periods in advance of school classes, such that at each scheduled event, the eBook reader device 100 displays the cover image of eBook associated with the next class text.

There are different ways to implement the scheduler 216. In one implementation, the scheduler 216 offers a user interface that allows the user to define scheduled events in which to cause a screen conversion. In another implementation, the scheduler 216 works in the background to coordinate with a calendaring application (not shown) that resides on the eBook reader device or on an external computing system with which the eBook reader device communicates. The scheduler 216 imports from the calendaring application one or more scheduled events pertaining to the consumption of content items on the eBook reader device. Moreover, this information may be pushed to the eBook reader device from a remote location over a network, such as a wireless network. For instance, the user may maintain a schedule or other events at an online service (e.g., computing cloud or service) that sends such events to the eBook reader device, and these events are used by the last screen rendering module 110 to convert the display screen.

The behavior monitor 218 establishes screen conversion events based on the user's behavior. Over time, the behavior monitor 218 monitors user behavior during interaction with the eBook reader device. As part of this monitoring, the behavior monitor 218 observes which content items the user consumes at different times of day or days of the week. The behavior monitor 218 may identify, for example, one or more eBooks that the user may likely want to read based on past behavior. For example, the behavior monitor 218 may learn from observed patterns that the user reads the Bible each morning between 7:00 am and 8:00 am, and that the user tends to read a book on architecture every Monday, Wednesday, and Friday, between 10:00 am and noon, in advance of a class at college. Further, the user may be found to listen to audio versions of science fiction novels most evenings, after 9:00 pm.

The behavior monitor 218 then establishes screen conversion events around the observed activities, and associates one or more content items that the users are likely to consume with screen conversion event. For instance, the behavior monitor 218 may set a screen conversion event for every morning at, say, 6:45 am (in advance of the usual behavior of 7:00 am to 8:00 am), and associate the Bible with this event. When the screen rendering module 110 detects this screen conversion event, it causes the display to render a cover image of the Bible in anticipation of the user picking up the eBook reader device to read the Bible at the regular time.

As shown in both FIGS. 1 and 2, the eBook reader device 100 has a display 102. In one implementation, the display uses ePaper display technology. As noted above, the ePaper display technology is bi-stable, meaning that it is capable of holding text or other rendered images even when very little or no power is supplied to the display. Some exemplary ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

In the same or different implementations, the display 102 may be a flexible display and further include a touch sensitive membrane, film, or other form of sensing material. The flexible display may be positioned, for example, above a touch sensor(s). The touch sensor(s) may be a resistive touch sensitive film. The flexible display may also include a protective layer made of a flexible material such as plastic. The flexible display may also include a flexible backplane layer. The backplane may also be made of a flexible material, such as plastic, metal, glass or a polymer based material. A flexible backplane may be bendable, rollable, light-weight, etc. In one configuration, the flexible backplane is a matrix backplane on a plastic substrate.

The eBook reader device 100 may further be equipped with various input/output (I/O) components 220. Such components may include various user interface controls (e.g., buttons, joystick, keyboard, etc.), audio speaker, microphone or audio input, connection ports, and so forth.

One or more communication interfaces 222 are provided to facilitate communication with external, remote computing sources over various networks or with other local devices. Content (e.g., eBooks, magazines, audio books, etc.), program modules, and screen conversion events, may be transferred to the eBook reader device 100 via the communication interfaces(s) 222. The communication interface(s) 222 support both wired and wireless connection to various networks, such as cellular networks, radio, WiFi networks, short range networks (e.g., Bluetooth), IR, and so forth. The communication connection(s) 222 support both wired and wireless communications with various types of networks, including the Internet. For example, the eBook reader device 100 may be equipped with a radio frequency transceiver to facilitate wireless communication over a wireless network. The device may further include a communication connection that facilitates communication with other devices via, for example, Bluetooth, radio frequency, or infrared connection(s). The communication connection(s) 222 are one example of communication media. Communication media may typically be embodied by computer readable instructions, data structures, program modules, or other data in a modulated data signal, such as a carrier wave or other transport mechanism, and includes any information delivery media.

The eBook reader device 102 also includes a battery and power control unit 224. The power control unit operatively controls an amount of power, or electrical energy, consumed by the eBook reader device. Actively controlling the amount of power consumed by the reader device may achieve more efficient use of electrical energy stored by the battery. The processing unit 202 may supply computing resources to the power control unit 224, which may further include a clock/timer for accurate control of power consumed by the eBook reader device 100.

The eBook reader device 100 may have additional features or functionality. For example, the eBook reader device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In some implementations the eBook reader device 100 may also include a vibrator 226 or other output device for creating a haptic output that is detectable by a user touching the eBook reader device 102. The eBook reader device 100 may further include, in some implementations, an accelerometer 228 for detecting the orientation of the device.

Figure 3:
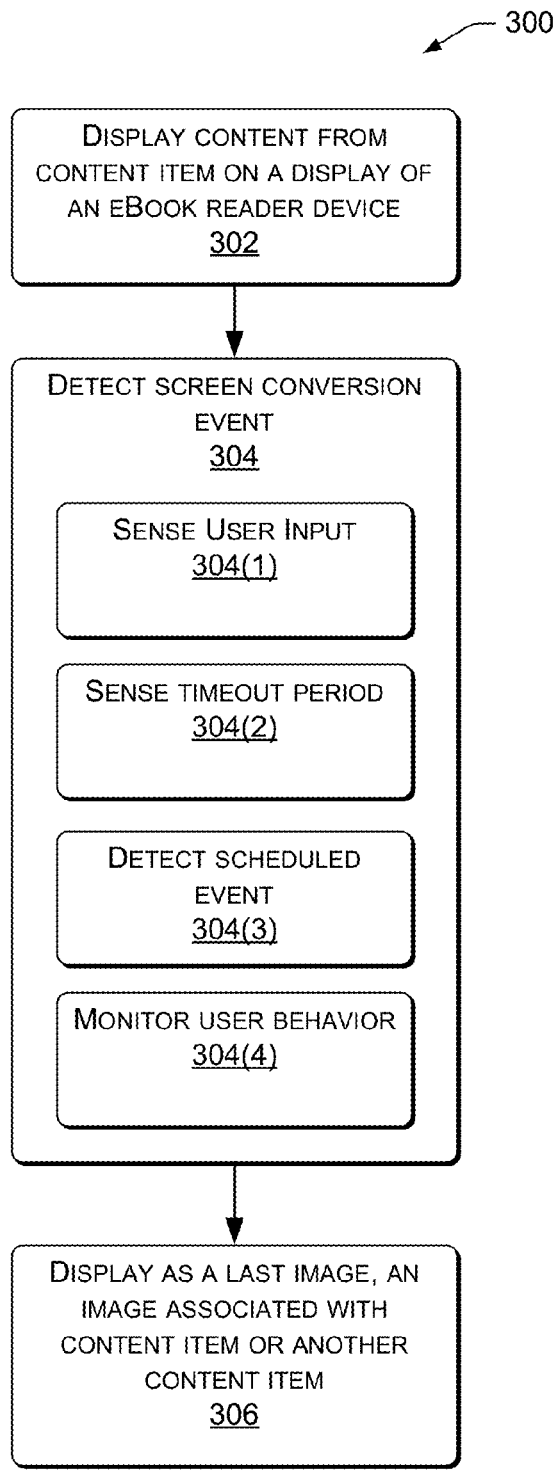
FIG. 3 is a flow diagram illustrating an exemplary process for converting a display of an eBook reader device from its current image to a last image that allows the eBook reader device to more readily convey an identity of a content item.

FIG. 3 shows a general process 300 for converting a display of an eBook reader device from its current image to a last image that allows the eBook reader device to more readily convey an identity of a content item, such as the content item's cover. For ease of understanding, the process 300 (as well as processes 400 in FIG. 4, 500 in FIGS. 5, and 600 in FIG. 6) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 300 is described with reference to the eBook reader device 100 of FIGS. 1 and 2.

The process 300 begins during normal user interaction with the eBook reader device 100. During this time, the user is consuming content items, such as eBooks, audio books, and so forth. Accordingly, at 302, content from the content item is displayed on the eBook reader device. For example, the current page from an eBook or corresponding text from an audio book may be displayed on the eBook reader device while the user is consuming the content item.

At 304, a screen conversion event is detected. The screen conversion events may be configured in various ways. In one approach, the screen conversion event may be tied to an explicit input from the user who is attempting to "power down" the eBook reader device, as represented by sub-act 304(1). The user may actuate a power control, for instance, that directs the eBook reader device to transition to a non-active state. The last screen rendering module 110 interprets this user input as a screen conversion event. In another approach, the screen conversion event is a timeout period, and hence, the detection occurs when the last screen rendering module 110 senses that the user has ceased engaging with the eBook reader device 100 for a threshold period of time, as represented by sub-act 304(2). In yet another approach, the screen conversion event may be a scheduled event, and hence, the detection occurs when the last screen rendering module 110 detects a previously scheduled event (such as a calendar event), as represented by sub-act 304(3). In still another approach, the screen conversion event may be an event stemming from past user behavior, and hence, the detection occurs when the last screen rendering module 110 monitors past user behavior and sets events based thereon, as represented by sub-act 304(4).

At 306, in response to detecting the screen conversion event, a "last" image associated with the content item or another content item is displayed on the eBook reader device. This last image is an image selected to convey a content item more readily to the user in the future. For instance, for eBooks, the last image may be a book cover, or a special composite that might include, for example, a title, author, last page read, reading statistics, and so forth. For newspapers or magazines, the last image may be a cover page, a graphical title, or any other combination of design elements that convey an identity of the newspaper or magazine. For an audio book, the last image may be that of the audio book cover or a picture of the actor who is reading the book.

While FIG. 3 shows a general process, the following discussion provides some illustrative usage scenarios. In particular, three representative usage scenarios are described: (1) screen conversion based on time lapse; (2) screen conversion based on date/time; and (3) screen conversion based on user behavior. These scenarios are merely representative and not intended to be exhaustive. Other permutations or variations are possible. Further, for ease of discussion, each scenario is presented in the context of a user reading eBooks on the eBook reader device. However, the aspects described herein may be applied to other content items, such as audio books.

Screen Conversion Based on Time Lapse

In the first usage scenario, conversion to the last image on the eBook reader device is achieved by detecting a timeout period.

Figure 4:
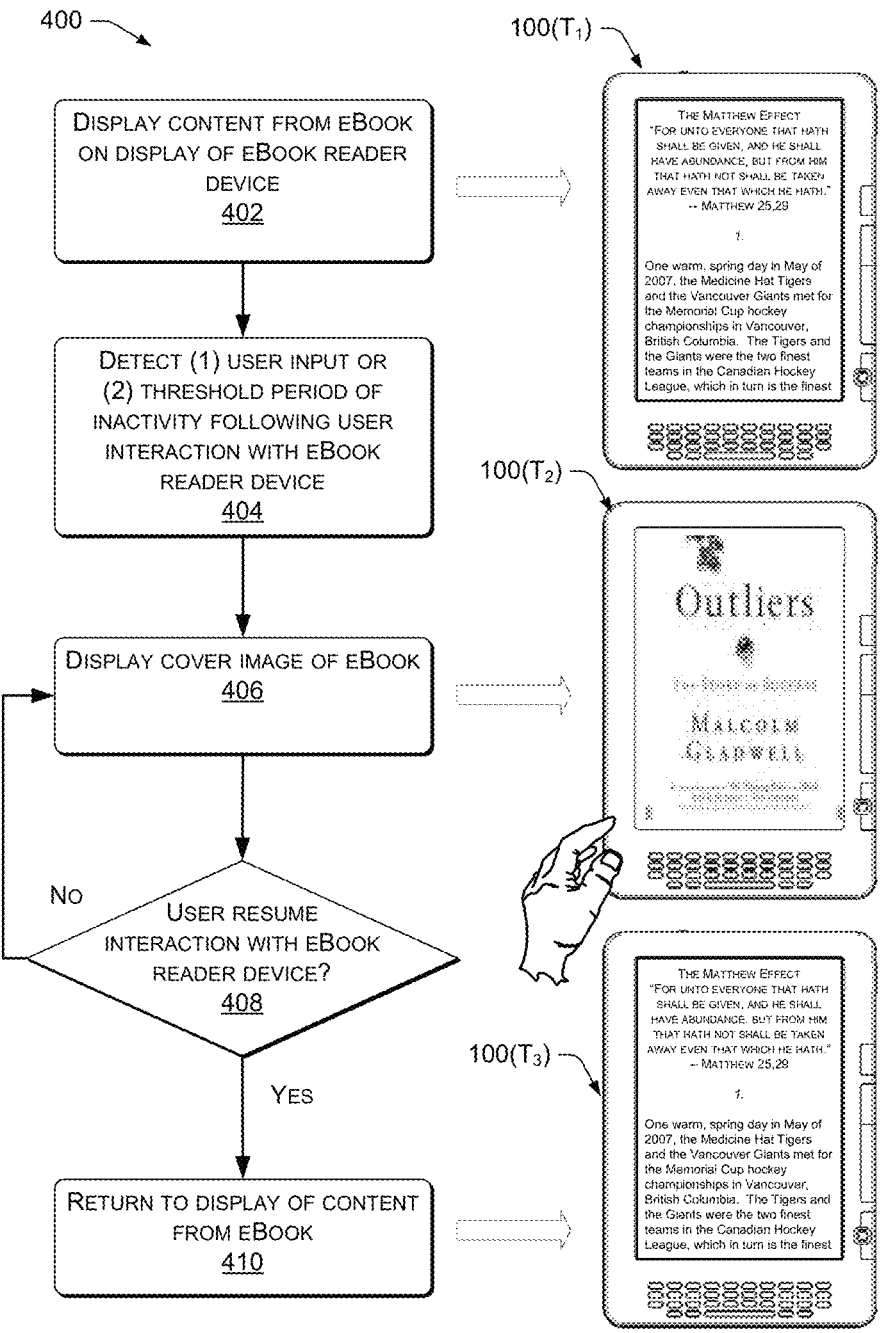
FIG. 4 is a flow diagram illustrating a process for changing the display of the eBook reader device to the last image based on time lapse since the user last interacted with the device.

FIG. 4 shows a process 400 for changing the display of the eBook reader device to the last image based on time lapse since the user last interacted with the device. To aid understanding, the display of the eBook reader device 100 is depicted at certain times during the process 400 to illustrate one example of how the screen may be changed to present the last image.

At 402, content from an eBook is displayed on the eBook reader device. For illustration, the screen of the eBook reader device 100 is shown depicting a page from the eBook "Outliers", by Malcolm Gladwell. This page is being shown on the device 100 at time $T_1$. Recall from above that a "page" as described herein may be understood as a virtual frame of the content, or a visual display window presenting the content to the user. The pages presented on the eBook reader device 100 may not correspond directly to the identical hard pages in the associated physical book. Depending on display capabilities, font size, and other such parameters, any given "page" displayed on the eBook reader device 100 may contain more or less text/graphics than the corresponding hard page.

At 404, a user input to power down the device, or a threshold period of inactivity, following a period in which the user was regularly interacting with the eBook reader device, is detected. This inactivity may be manifest in different ways, including by a failure to receive any input from the user (e.g., page turn request, navigation, adding an annotation, etc.) for a period of time, or by a failure to detect any movement of the device by the accelerometer 228 (if present), or other ways.

At 406, in response to detection of the timeout period, the content on the screen is replaced with a cover image of the eBook. Thus, at time $T_2$, the cover image for the eBook "Outliers" is rendered as the last image on the eBook reader device $100(T_2)$. The cover image remains visible on the screen of the eBook reader device $100(T_2)$ until the user once again begins interacting with the device, or until another screen conversion event occurs (e.g., calendar event or behavior-based event). Thus, the eBook reader device maintains an appearance of the book that the user is presently reading, rather than a generic electronic device.

At 408, it is determined whether the user resumes interaction with the eBook reader device. If not (i.e., the "No" branch from 408), the device remains in rest mode and the cover image persists on the screen. However, once the user resumes interaction with the device (i.e., the "Yes" branch from 408), the eBook reader device returns to the content where the user left off. Thus, at time $T_3$, the last page the user was reading is displayed once again, at 410. As illustrated, the eBook reader device $100(T_3)$ shows the same page of the eBook "Outliers" as was being depicted at time $T_1$ when the user stopped reading previously.

Screen Conversion Based on Scheduled Date/Time

In another usage scenario, the eBook reader device renders the last image in response to a scheduled conversion event that is based on a date, a time-of-day, or both.

Figure 5:
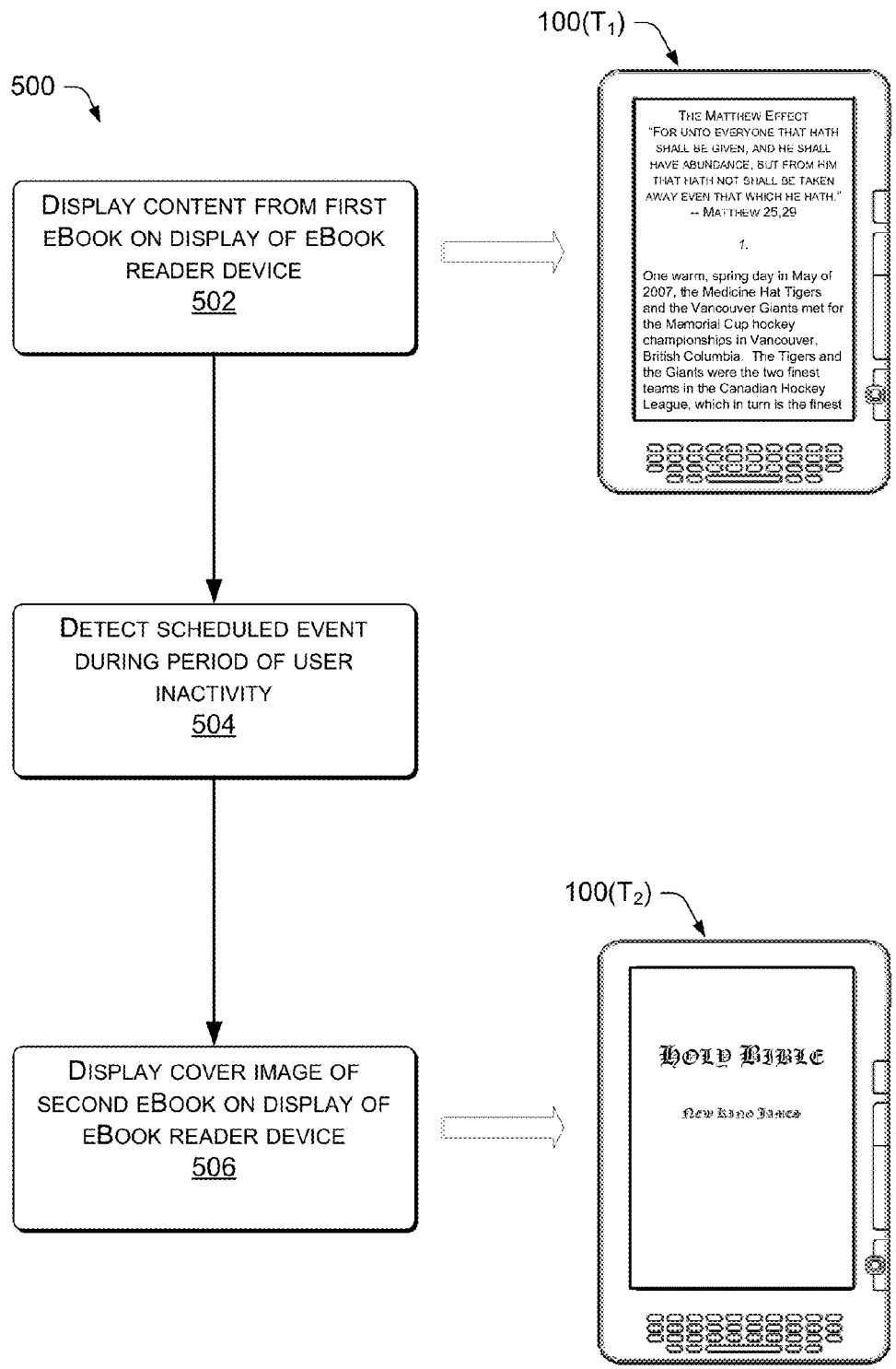
FIG. 5 is a flow diagram illustrating a process for changing the display of the eBook reader device to the last image in response to a scheduled screen conversion event.

FIG. 5 shows a process 500 for changing the display of the eBook reader device to the last image in response to a scheduled screen conversion event. To aid understanding, the display of the eBook reader device 100 is depicted at two different times, $T_1$ and $T_2$, during the process 500 to illustrate one example of how the screen may be changed to present the last image.

At 502, content from a first eBook is displayed on the eBook reader device. In this illustration, the screen of the eBook reader device 100 depicts a page from the eBook "Outliers". This page is being shown on the device 100 at time $T_1$.

At 504, a scheduled event is detected during a period of user inactivity. The scheduled event may be entered by the user, or retrieved from querying a calendaring application. Further, the scheduled event may be pushed or retrieved from a remote source, such as a calendaring application on a separate computing device or from an online service available over a network. In this example, suppose the user schedules periodic times to read from the Bible at specified times of the day, and days of the week.

At 506, in response to detecting a scheduled event, the cover image of the eBook associated with the scheduled event is depicted on the screen of the eBook reader device. In our continuing example, at time $T_2$, the cover image for the Bible is shown on the eBook reader device $100(T_2)$. In this example, the second eBook (e.g., Bible) is different from the first eBook (e.g., Outliers) that the user was last reading. However, in situations where the user was last reading the same eBook that is being triggered by the scheduled event, the cover image of the same book will appear.

Screen Conversion Based on User Behavior

In yet another usage scenario, conversion to the last image on the eBook reader device is achieved by observing user behavior and establishing screen conversion events based on the behavior.

Figure 6:
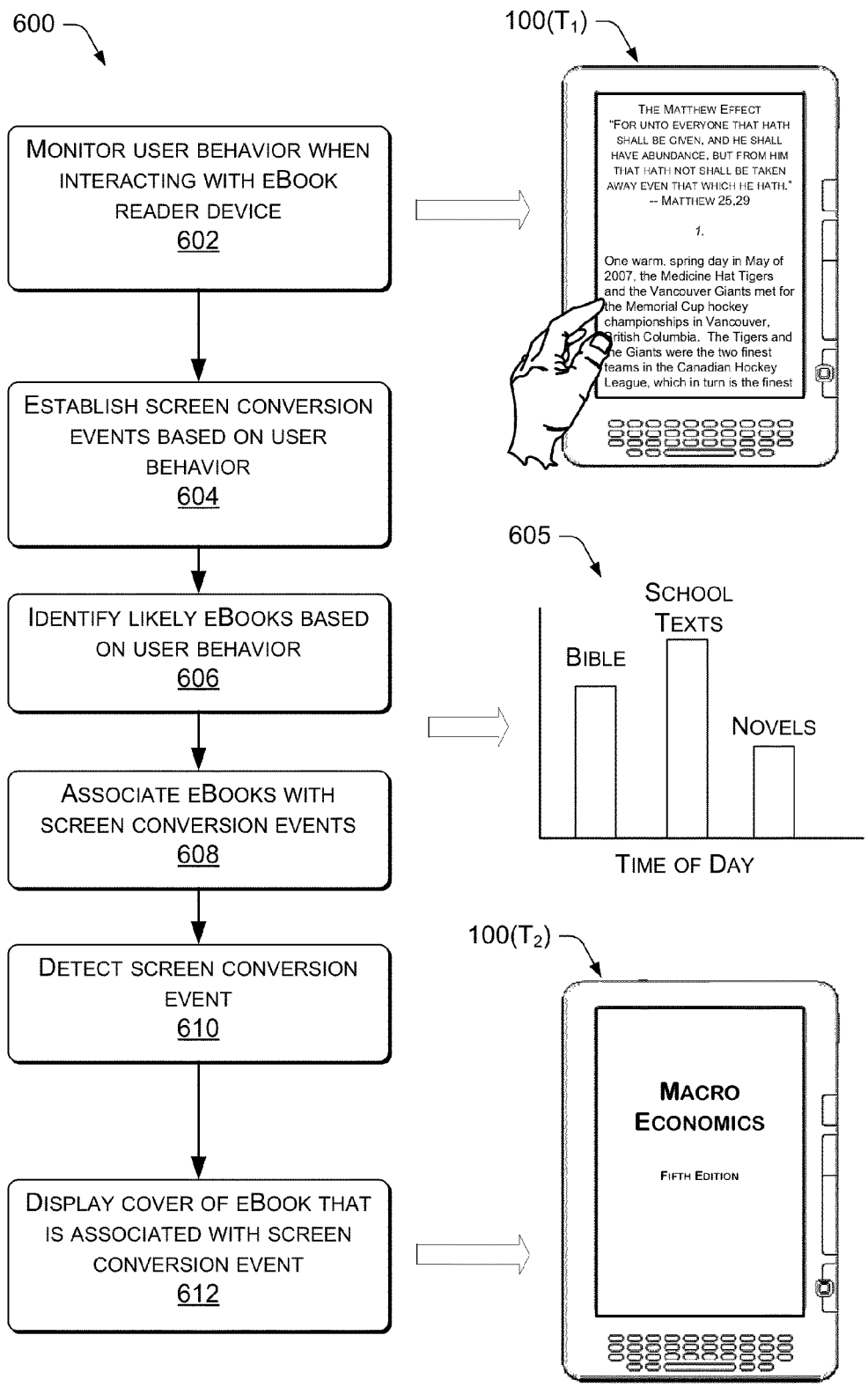
FIG. 6 is a flow diagram illustrating a process for changing the display of the eBook reader device to the last image based on observed patterns in user behavior.

FIG. 6 shows a process 600 for changing the display of the eBook reader device to the last image based on observed patterns in user behavior. As above, the display of the eBook reader device 100 is depicted at different times, $T_1$ and $T_2$, during the process 600 to illustrate one example of how the screen may be changed to present the last image.

At 602, user behavior during interaction with the eBook reader device 100 is monitored over time. In this example, at time T1, the user happens to be reading a page from the eBook "Outliers".

At 604, one or more screen conversion events are established based on the user behavior. For instance, the user may exhibit a pattern of reading certain genre of eBooks during different times of the day or days of the week. Such patterns may be tracked over time and statistically analyzed. As one simple approach, the device may develop a histogram that tracks the number of times a user reads particular eBooks at predefined times of day (e.g., morning, mid-day, evening). In FIG. 6, a simple histogram 605 showing the highest occurring genre of eBook in the corresponding time slot. Thus, the Bible is the most often read eBook in the morning time slot, school texts during the mid-day time slot, and novels at night. Based on this behavior, three screen conversion events—morning, mid-day, and evening—may be established to change the image displayed on the screen of the eBook reader device.

At 606, eBooks that the user is likely to read in the various time slots are identified. For instance, the eBook reader device may identify certain school texts that the user is currently consuming and certain novels that the user has not yet completed.

At 608, the identified eBooks are associated with the screen conversion events. Thus, the school texts are associated with a screen conversion event that is set for mid-day, and the novels are associated with the screen conversion event that is set for evening.

At 610, a screen conversion event is detected. Suppose, for example, that the screen conversion event is the one set to mid-day.

At 612, in response to detecting this event, the cover image of an eBook that is associated with the screen conversion event is displayed. In this example, since the screen conversion event is at mid-day, the user is likely to read a school text based on past behavior. Thus, at time $T_2$, the cover image of the text "Macro Economics" is rendered on the eBook reader display $100(T_2)$.

Last Image with Progress Information

In addition to rendering a last image, the eBook reader device may further provide progress information that helps the user understand how much of the content item has been consumed, and what remains. The progress information may be in the form of a textual summary, such as how many pages are in the eBook, what page the user last read, the percentage of the book that has been read and/or unread, and so forth. Alternatively, the progress information may be a graphical element that conveys progress through the content item.

Figure 7:
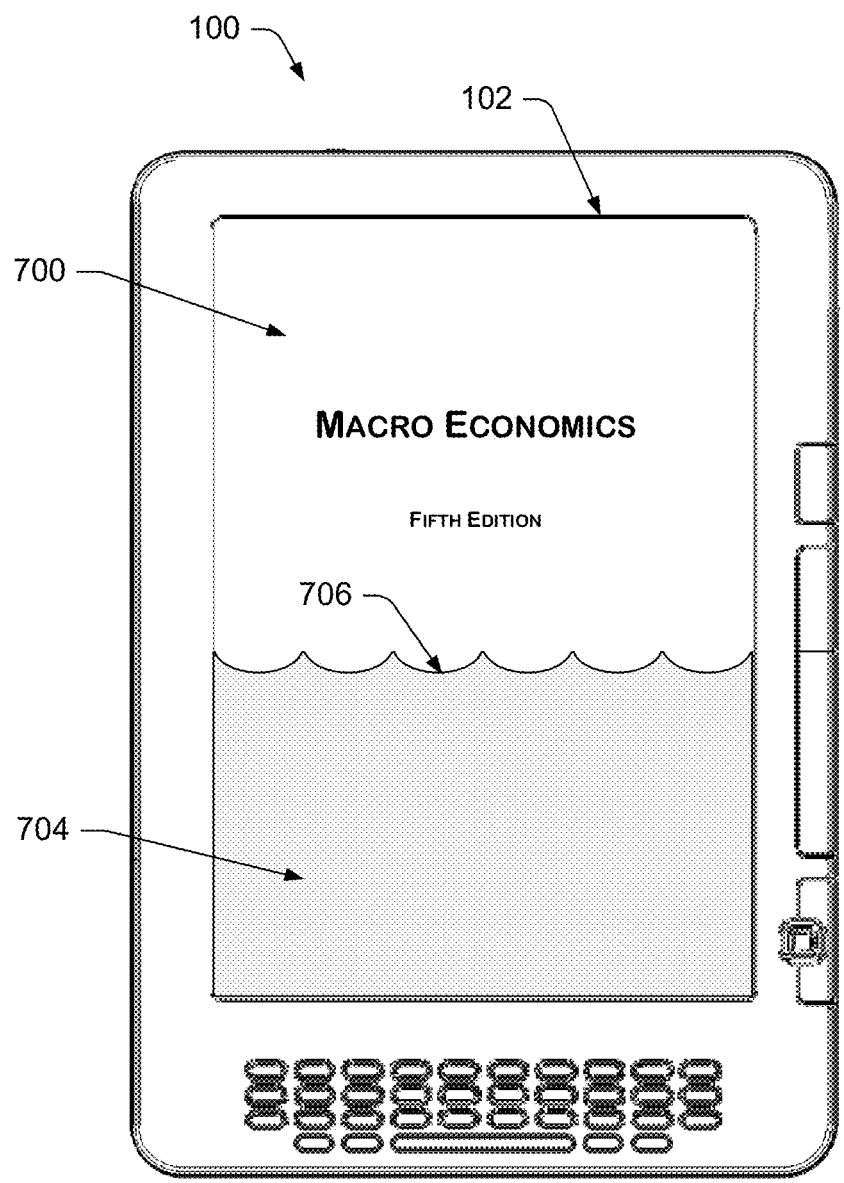
FIG. 7 shows a front plan view of the eBook reader device with a last image depicted on the display. The last image is modified to exhibit user progress through the content item represented by the last image.
Figure 8:
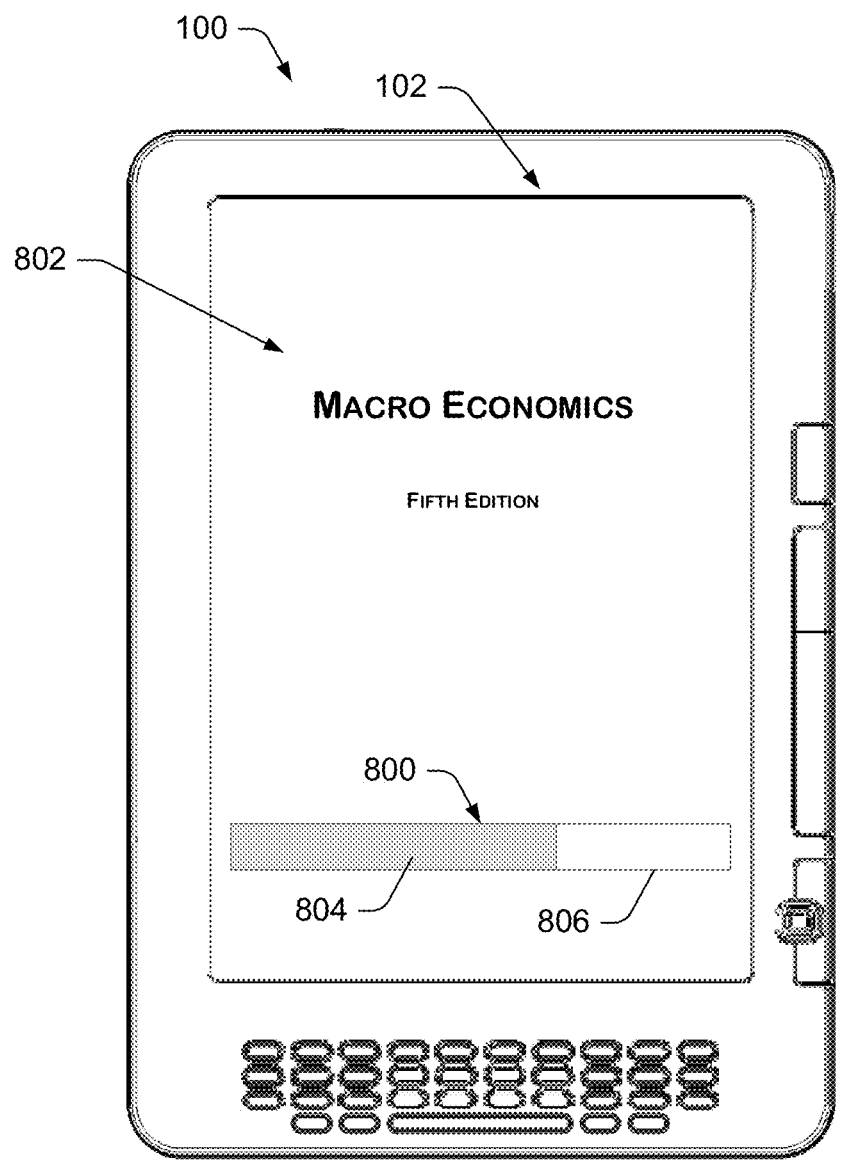
FIG. 8 shows a front plan view of the eBook reader device with a last image depicted on the display, and accompanied by a progress indicator in the form of a bar graph.
Figure 9:
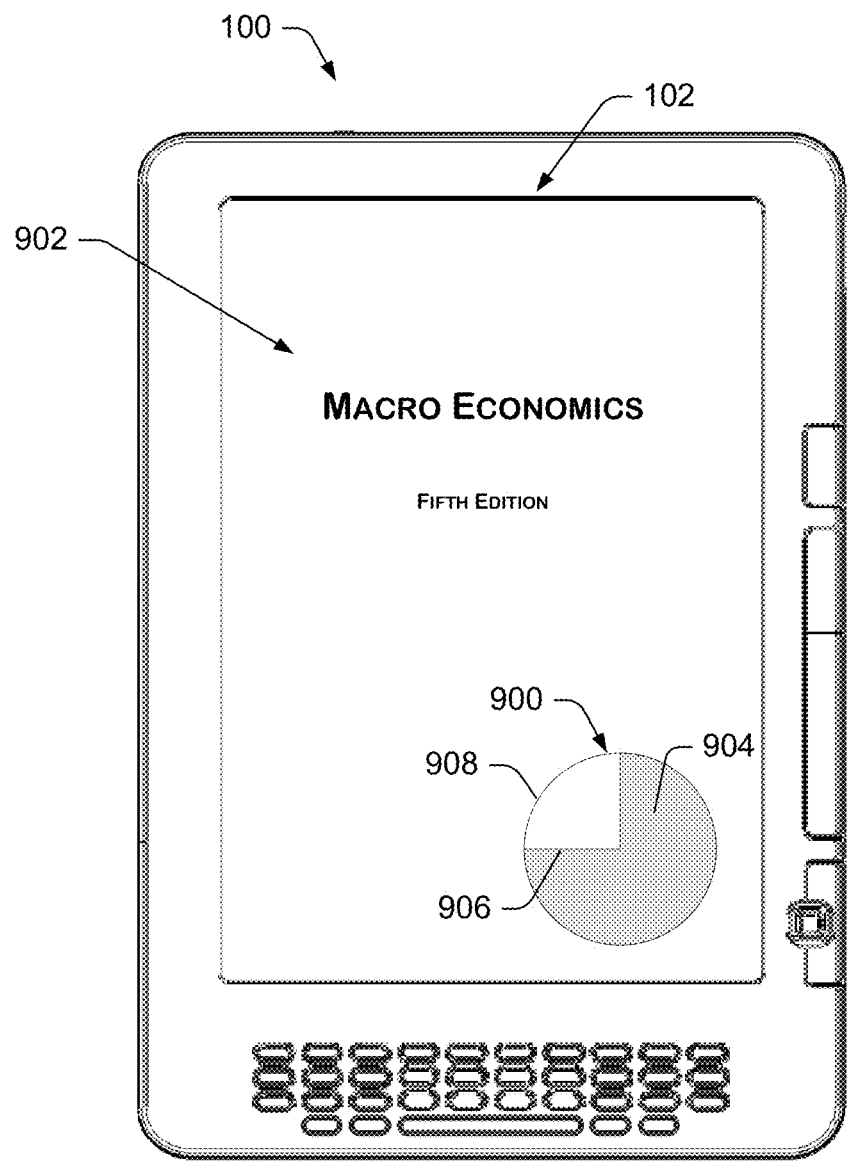
FIG. 9 shows a front plan view of the eBook reader device with a last image depicted on the display, and accompanied by a progress indicator in the form of a pie graph.

FIGS. 7-9 show three different examples of graphical elements that convey progress. In FIG. 7, the progress indicator is implemented by modifying the last image based on the amount of progress made through the content item. Here, the eBook reader device 100 shows the cover of the school text "Macro Economics" as a last image 700 on the screen 102. A progress indicator 704 visually modifies the cover image by changing a part of the cover image in proportion to the amount of the eBook the user has read. In FIG. 7, the progress indicator 704 shows the cover image changing from the bottom to the top, thereby giving the appearance of the image filling as the user reads more of the eBook. Here, the user is approximately half way through the text, as graphically represented by the modified lower half of the image. The top of the filled portion further includes a non-linear delineator 706 to provide an appearance that the cover image is being filled with a liquid (e.g., water) as progress is made. This is just one possible way to modify the cover image, and many others are possible.

FIG. 8 shows another implementation in which the progress indicator is a progress bar 800 that is provided somewhere on the display 102 of the eBook reader device 100. In this example, the progress bar 800 is arranged horizontally across a lower part of the last image 802. The progress bar 800 includes a slider element 804 that grows within a hollow predefined region 806 to represent a proportion of the eBook completed. As the user reads, the slider element 804 fills more and more of the predefined region 806. Upon completion, the slider element 804 entirely fills the predefined region 806.

FIG. 9 shows yet another implementation in which the progress indicator is embodied as a pie graph 900 positioned on the display 102 of the eBook reader device 100. In this example, the progress pie graph 900 is positioned in the lower right-hand corner of the last image 902, although other locations are possible. The progress pie graph 900 includes a fill element 904 that enlarges as a leading edge 906 sweeps through a predefined circular region 908, akin to a minute arm of a clock moving over a clock face. As the user reads, the fill element 904 fills more of the predefined circular region 908. Upon completion, the fill element 904 entirely fills the predefined circular region 908.

These are just three possible examples. Other representations of progress may be implemented, and the progress indicators may be integrated with the cover image, or overlaid as a separate element.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
under control of an electronic book reader device configured with executable instructions, performing the following:
displaying content from an electronic book on a display of the electronic book reader device, the electronic book having an associated cover image;
detecting at least one of (1) a threshold period of inactivity in which a user ceases interacting with the electronic book reader device or (2) a user input to transition the electronic book reader device from an active state; and
responsive to the detecting, displaying the cover image of the electronic book.

2. The computer-implemented method of claim 1, wherein the threshold period of inactivity is configurable.

3. The computer-implemented method of claim 1, wherein the threshold period of inactivity is at least ten minutes.

4. The computer-implemented method of claim 1, wherein the cover image comprises a graphical representation of a cover of the electronic book.

5. The computer-implemented method of claim 1, wherein the cover image comprises a title of the electronic book.

6. The computer-implemented method of claim 1, wherein the cover image is visually modified to represent user progress through the electronic book.

7. The computer-implemented method of claim 1, further comprising providing a progress indicator to represent user progress through the electronic book.

8. The computer-implemented method of claim 1, further comprising, whereupon the user begins interacting with the electronic book reader device following the period of inactivity, restoring display of the content of the electronic book that was last presented prior to displaying the cover image.

9. The computer-implemented method of claim 1, further comprising:
detecting a scheduled event during a period in which the user is not interacting with the electronic book reader device; and
responsive to detecting the scheduled event, displaying a cover image of another electronic book.

10. The computer-implemented method of claim 9, wherein the scheduled event is defined by the user.

11. The computer-implemented method of claim 9, wherein the scheduled event is ascertained from a calendaring program.

12. The computer-implemented method of claim 9, wherein the scheduled event is learned from behavior of the user.

13. A computer-implemented method comprising:
displaying content from a first content item on a display of an electronic book reader device;
detecting a screen conversion event during a period of inactivity in which a user is not interacting with the electronic book reader device; and
displaying one of (1) a first image associated with the first content item, or (2) a second image associated with a second content item.

14. The computer-implemented method of claim 13, wherein the first content item comprises an electronic book.

15. The computer-implemented method of claim 13, wherein the first and second content items comprise electronic books and the first and second images comprise graphical representations of covers of the electronic books.

16. The computer-implemented method of claim 13, wherein the screen conversion event comprises lapse of time.

17. The computer-implemented method of claim 13, wherein the screen conversion event comprises a user input to transition the electronic book reader device from an active state to a non-active state.

18. The computer-implemented method of claim 13, wherein the screen conversion event comprises a scheduled event.

19. The computer-implemented method of claim 13, wherein the screen conversion event comprises a behavior-based event learned from observing user behavior when interacting with the electronic book reader device.

20. The computer-implemented method of claim 13, further comprising providing a progress indicator to represent user progress through the first content item.

21. The computer-implemented method of claim 20, wherein the progress indicator comprises a visual modification of one of the first image or the second image.

22. The computer-implemented method of claim 20, wherein the progress indicator comprises a graphical element that changes appearance in proportion to an amount of the first content item that the user has consumed.

23. A computer-implemented method comprising:
under control of an electronic book reader device configured with executable instructions, performing the following:
displaying content from a first electronic book on a display of the electronic book reader device;

detecting a scheduled event during a period of inactivity in which a user is not interacting with the electronic book reader device; and responsive to detecting the scheduled event, displaying an image associated with a second electronic book.

24. The computer-implemented method of claim 23, wherein the image comprises a graphical representation of a cover of the second electronic book.

25. The computer-implemented method of claim 23, wherein the scheduled event comprises an event entered by the user.

26. The computer-implemented method of claim 23, wherein the scheduled event comprises an event retrieved from a calendaring application.

27. The computer-implemented method of claim 23, further comprising providing a progress indicator to represent user progress through the second electronic book.

28. A computer-implemented method comprising:
under control of an electronic book reader device configured with executable instructions, performing the following:
monitoring user behavior during interaction with the electronic book reader device;
establishing a screen conversion event based on the user behavior;
identifying one or more electronic books that the user may elect to read based on the user behavior;
associating the one or more electronic books with the screen conversion event;
detecting the screen conversion event during a period of inactivity in which a user is not interacting with the electronic book reader device; and
responsive to detecting the screen conversion event, displaying an image associated with one of the one or more electronic books associated with the screen conversion event.

29. The computer-implemented method of claim 28, wherein the image comprises a graphical representation of a cover of the electronic book.

30. The computer-implemented method of claim 28, wherein the monitoring comprise observing which content items the user consumes at different times of the day or week.

31. The computer-implemented method of claim 28, wherein the monitoring comprises deriving a pattern of user consumption of content items.

32. A dedicated electronic book reader device, comprising:
a processor;
a memory accessible by the processor;
an ePaper-type display to present one or more pages of a first electronic book responsive to user input; and
a last screen rendering module stored in the memory and executable by the processor, the last screen rendering module detecting a screen conversion event and in response, causing the ePaper-type display to present one of (1) a visible representation associated with the first electronic book that is different than a last page displayed in response to the user input, or (2) a visible representation associated with a second electronic book.

33. The dedicated electronic book reader device of claim 32, wherein the last screen rendering module comprises a timer component to detect when a user ceases interacting with the dedicated electronic book reader device for a threshold period of time, the screen conversion event being generated responsive to the timer detecting the threshold period of time.

34. The dedicated electronic book reader device of claim 32, wherein the last screen rendering module comprises a scheduler component to detect occurrence of a scheduled event, the screen conversion event being generated responsive to the scheduler component detecting the scheduled event.

35. The dedicated electronic book reader device of claim 32, wherein the last screen rendering module comprises a behavior monitor component to establish the screen conversion event based on user behavior when interacting with the dedicated electronic book reader device.

36. The dedicated electronic book reader device of claim 32, wherein the last screen rendering module provides a progress indicator to represent user progress through the second electronic book.

37. A computer-readable storage medium having stored therein instructions, which when executed by an electronic book reader device having a display, cause the electronic book reader device to perform acts comprising:
rendering a first image representation of content in a first electronic book;
detecting a screen conversion event; and
rendering a second image representation that is different from the first image representation, wherein the second image representation is one of associated with the first electronic book or associated with a second electronic book.

38. The computer-readable storage medium of claim 37, wherein the first and second image representations comprise images of covers associated with the first and second electronic books.

39. The computer-readable storage medium of claim 37, wherein the screen conversion event comprises lapse of a period of inactivity in which a user ceases interacting with the electronic book reader device.

40. The computer-readable storage medium of claim 37, wherein the screen conversion event comprises a user input to transition the electronic book reader device from an active state to a non-active state.

41. The computer-readable storage medium of claim 37, wherein the screen conversion event comprises a scheduled event.

42. The computer-readable storage medium of claim 37, wherein the screen conversion event comprises a behavior-based event learned from observing user behavior when interacting with the electronic book reader device.

* * * * *